Oct. 27, 1936.  E. Q. SMITH  2,058,733
CLIP FOR MOUNTING TUBES, ETC
Filed Feb. 3, 1936
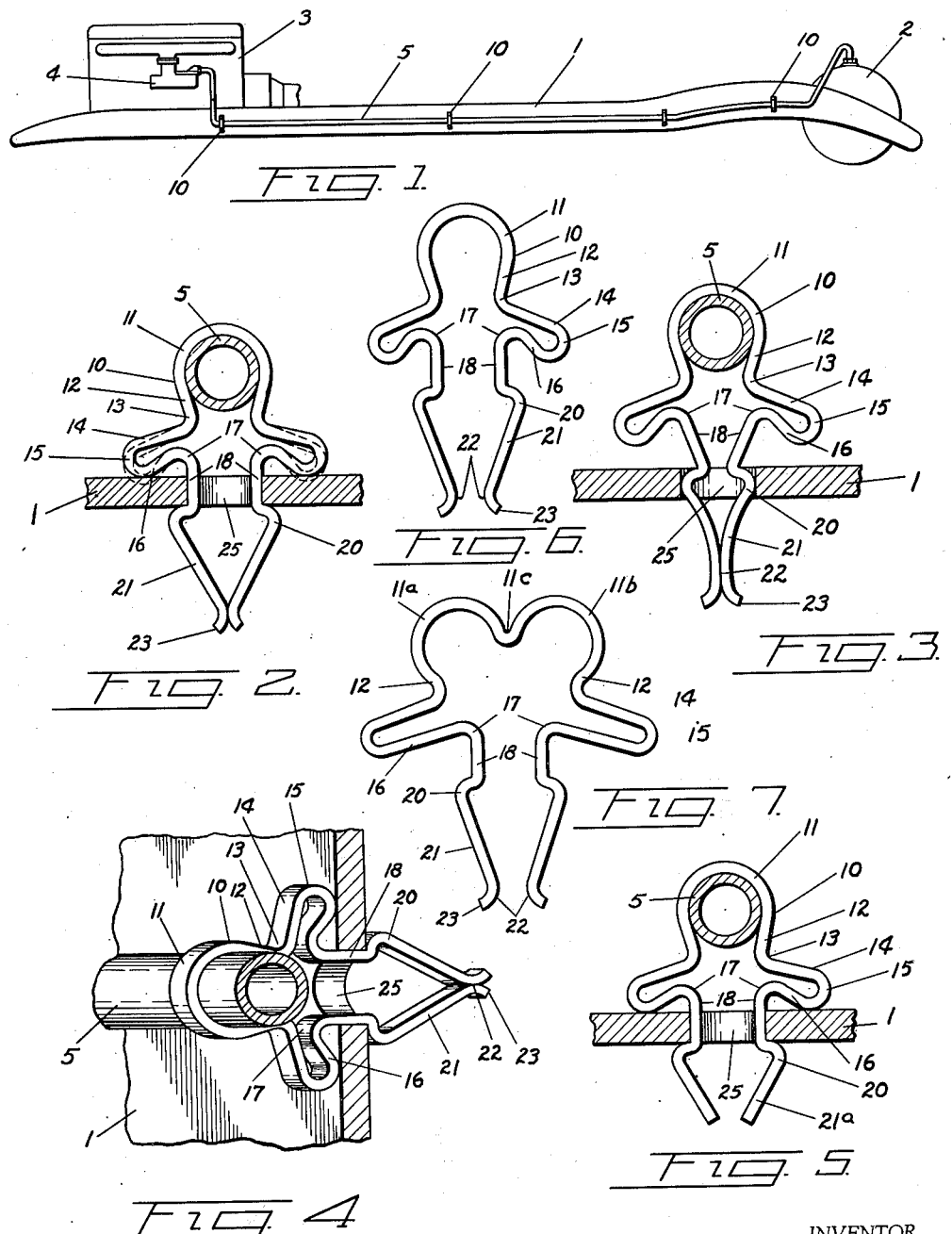
INVENTOR.
E. QUIMBY SMITH
BY
Barnes, Kisselle, Laughlin & Raisch
ATTORNEY.

Patented Oct. 27, 1936

2,058,733

UNITED STATES PATENT OFFICE 2,058,733

CLIP FOR MOUNTING TUBES, ETC.

Emmet Quimby Smith, Detroit, Mich.

Application February 3, 1936, Serial No. 62,029

12 Claims. (Cl. 24—73)

This invention relates to the mounting of tube lines or other similar objects, and it has to do particularly with the mounting of tube lines on automobile chassis.

The objects of the invention include the provision of a clip which can be easily and cheaply manufactured, which will strongly hold a tube line mounted on an automobile chassis, and which, and this is one of the important points, is easily and quickly assembled into tube holding position. It has been found that where a gasoline line on an automobile becomes heated, as for example the gasoline supply line leading from the gasoline tank usually at the rear of the vehicle to the engine, a vapor lock may occur. To overcome this it has been proposed to mount the tube line in spaced relation to the chassis parts to provide for adequate ventilation and heat dissipation all around the tube. It is a further object of this invention to provide a clip by means of which a tube line can be easily and quickly mounted in a chassis which will hold the tube strongly in position and which also holds the tube in spaced relation with regards to the supporting chassis part.

At present the devices for holding tube lines onto a chassis are awkward and cumbersome and some of them consist of sheet metal strip wrapped around the tube with a projecting end fashioned to abut against the chassis part, such as the frame, and a small bolt or similar element is taken through the projecting part of the strip and the frame. Therefore, the frame of the vehicle or other chassis part has to be provided with an aperture to receive the bolt. My invention does not complicate the chassis structure in any way, as a simple aperture in a chassis part is all that is necessary to receive the clip, while at the same time a better, cheaper, more easily installed and serviced clip is provided.

In the accompanying drawing:

Fig. 1 is a diagrammatic view illustrating the frame, gasoline tank and engine of an automotive vehicle and showing the gasoline tube line.

Fig. 2 is a view showing a supporting part and a tube in cross section, with the clip in side elevation and with the parts assembled, with a dotted line illustration indicating flexure.

Fig. 3 is a view designed to illustrate an assembly operation.

Fig. 4 is a perspective view with the tube and chassis part shown in cross section and illustrating a clip made from stock rectangular in cross section.

Fig. 5 is a view of a modified form of clip.

Fig. 6 is a view of the clip in detached condition.

Fig. 7 is a view showing a modified form for holding two tubes.

The frame of an automotive vehicle is illustrated at 1, with a gasoline tank 2 mounted at the rear thereof, and an engine 3 provided with a carburetor 4 which may be equipped with a pump portion for pumping the gasoline from the tank. A tube 5 connects the tank and the carburetor. The installation shown in Fig. 1 is materially simplified by lack of additional structure, some of which interferes with the straight run of the tube, but this is rather beside the point. Suffice it to say that the tube is attached to the frame or other part of the vehicle in its extent from the tank to the engine by suitably spaced or located clips as illustrated at 10.

In the illustration of Fig. 1 the tube 5 is mounted on the outside of the frame, but of course it is to be understood that the tube can be mounted on any suitable supporting parts. The assembled clip, tube and frame are shown in Fig. 2. The clip is preferably made of spring steel stock of any suitable cross section. The stock may be rectangular in cross section, as illustrated in Fig. 4, although this shape is not indispensable, as a piece of round or otherwise shaped spring steel wire will do. The clip as shown in the drawing is made of a single piece of material shaped and fashioned into the desired form. It is provided with a tube engaging portion and with support engaging portions, with these tube engaging and support engaging portions so located that the tube is spaced from the support, and it is preferably provided with parts so shaped as to adapt the clip to be readily inserted into an aperture in the support.

To this end, the clip is fashioned with a bight portion 11 of somewhat circular form within which the tube 5 is to fit as illustrated and which grips the tube. From the bight portion 11 opposed parts 12 extend inwardly so that the dimension thereacross is less than the diameter of the tube. As shown, the tube engaging portion 11 is constituted by the central part of the length of material forming the clip, and there are legs or tines projecting from the portion 11. The legs or tines are fashioned with a bend 13 at the juncture between the portions 12 and outwardly extending parts 14. At the outer ends of parts 14 the material is provided with reverse bends 15 and thus inwardly extending portions 16 are provided. The parts 14, 15, and 16 constitute, in effect, outwardly projecting shoulders. The legs or tines are then fashioned with a bend 17 from which leads substantially straight parts 18. At the lower extremity of parts 18 the legs or tines are fashioned with outwardly projecting shoulders 20, and below these shoulders ("below" having reference to Fig. 2) the legs have converging parts 21 which, when in assembled form, preferably contact with each other as at 22 in assembled position, but which preferably are spaced apart in normal condition as shown in Fig. 6, and the extreme ends may be slightly divergent as at 23. The frame or other support 1 is provided with an aperture 25.

The procedure of mounting a tube on a chassis is subject to variation, depending upon the desires of the mechanic or the manufacturer. For example, a plurality of clips may be first inserted over the tube and then the clips forced through the apertures in the frame. Or each clip may be first forced over a tube and then through an aperture. In forcing the clip over the tube the diverging ends 33 serve to engage the tube and cause spreading of the legs. As the clip is forced through the aperture the portions 21 act as inclined planes and the clip is somewhat collapsed, as shown in Fig. 3. However, when the clip is finally positioned the legs spread apart, as shown in Fig. 2, and the shoulders 20 engage the side of the support opposite the tube.

The clip, in fact, engages the support on opposite sides, and this engagement is a secure one due to the springy nature of the material, and it is a lasting one due to the fact that the shoulders formed by the parts 14, 15 and 16, or in shorter terms, formed by the loops, are flexed. This is illustrated, in perhaps somewhat exaggerated manner, in Fig. 2 where the dotted line illustration is designed to demonstrate the normal position of the loops. When the clip is positioned it is done so with some pressure so as to flex the loops and allow the shoulders 20 to take a good grip on the opposite side of the frame. Therefore, the metal is under tension and the clip securely held in place. Moreover, as the loops or shoulders are flexed in positioning the clip, there is a tendency to bend the metal substantially at the point 13. Also, this action tends to urge the portions 12 further inwardly with the result that as the clip is pushed home the gripping engagement upon the tube is increased, and this pressure is maintained because of the permanent stresses set up in the material of the clip. I say "permanent" in the sense that in the normal life of an automotive vehicle or clip, the metal remains stressed so long as the clip is in its mounted position.

Thus the clip at once grips the tube, the clip itself tightly grips the frame or other support on opposite sides thereof, and the tube is effectively mounted in position in spaced relation with the frame or other chassis parts.

A modified form is shown in Fig. 5. This form is substantially the same as the one described above and differs therefrom in that the legs terminate in the converging portions 21a, with the extreme ends spaced apart. The other parts of the clip are the same and the same reference characters are applied. This form has been referred to at this point, as the structure thereof emphasizes an advantage occurring in the above described form, which is believed to be preferred.

In this Fig. 5 shoulders 20 are held outwardly to engage the support only by a cantilever action. In other words any force which tends to collapse the legs of the clip and pull the same out of the aperture is resisted by the cantilever action around the central part or bight 11. However, note that the shoulders 20 are quite abrupt so that considerable force is necessary. In connection with the form shown in Figs. 2, 3 and 4, the contact as at 22, together with the bight portion, forms a bridge so to speak in that the legs or tines are braced at opposite ends. Thus, in this form the clip is held more strongly in an assembled position.

The modified form shown in Fig. 7 is arranged to take two tubes or similar articles. The bight portion is fashioned into two loop forms 11a and 11b. The remaining parts are the same as the clip heretofore described and the same reference characters are used thereon. Between the loops 11a and 11b the bight portion has an inwardly extending part 11c. One tube at a time may be passed through the tines and fitted into the loops. The loops are preferably arranged to extend around more than one half of the circumference of the tubes, and the distance between the part 11c and the inwardly extending parts 12 is less than the tube diameters, so that the tubes are held gripped. It will be understood that any one of the clips shown herein may be made from wire stock, or the metal pieces may be cut from sheet stock. In some of the claims appended hereto it is said that the metal of the clip or the bight portion thereof is fashioned to receive a tube. This language is intended to describe the structure shown in Fig. 7, which does in fact receive a tube, but in addition receives another tube.

While the invention has been described in particular connection with use in mounting gasoline lines of automobile chassis, it is to be appreciated that the clip may be used for mounting tube lines of any kind of an automobile chassis or elsewhere, although it appears to be especially fitted for the purpose of mounting tube lines on automobile chassis.

In this connection the clip is not only desirable from the standpoint of cheapness of manufacture, the facility with which it may be mounted, and the manner in which the tube is held spaced from the support, but it is also highly desirable because it prevents rattles. The clip itself engages the support or frame with spring tension; it likewise engages the tube with tension, and further, there is nothing to come loose, as there are no bolts or nuts, so that a tight mounting will be maintained over an indefinite period.

It is to be understood, of course, that the clip of this invention is not only useful for attaching or mounting tubes; it is likewise useful for mounting other devices or objects such as wires, cables, rods or the like. In some of the claims appended hereto reference is made to the fact that the clip is for holding tube. Where this language is used it is to be understood that the word "tube" is to be construed to cover any other equivalent device such as the wire, cable or rod above mentioned, or other similar or equivalent object.

In the specification and some of the claims it is stated that portions or shoulders engage the support on the side thereof opposite the tube holding portion of the clip. This is done by the shoulders 20. This language is intended to cover and is to be construed to cover an arrangement where the shoulders or equivalent formation are not nearly so abrupt as those shown, the important thing being from this standpoint, and which is intended to be covered by this language, is that the clip engages the support to retain itself mounted in the aperture.

I claim:

1. A clip for attaching an article to a support having an aperture therein comprising, a single length of spring steel characterized by being relatively stiff and strong and fashioned into the form of a clip and said clip having: a portion substantially at one end thereof for receiving and holding the article with tension independently of other portions of the clip, a portion substantially at the opposite end of the clip adapted to be forced through said aperture, intermediate parts for lying in said aperture, outwardly projecting shoulders between the intermediate parts and the second named portion for engaging the support on the side thereof opposite the first named portion, and outwardly projecting shoulders for engaging the support on the side of the first mentioned portion, the second named shoulders and the first named portion being relatively positioned so that the first named portion is positioned spaced from the support whereby the article is held in a position spaced from the support.

2. A clip for attaching a tube or the like to a support having an aperture therein comprising, a single piece of spring metal characterized by being relatively stiff and strong and fashioned into the form of a clip and said clip having: a portion of rounded form for extending around the greater circumference of the tube to hold the same, portions adapted to be flexed inwardly when forced through said aperture, intermediate parts for lying in said aperture, outwardly projecting shoulders between the intermediate parts and the second named portions for engaging the side of the support opposite the first portion, and outwardly projecting shoulders between the intermediate parts and the first portion for engaging the support on the side of the first portion, the normal distance between the first named and second named shoulders being less than the thickness of the support whereby some of the shoulders are flexed and the support is gripped with tension, the first named portion and second named shoulders being relatively positioned so that the first named portion is spaced relative to the support.

3. A clip for attaching a tube or the like to a support having an aperture therein comprising, a single piece of spring metal characterized by being relatively stiff and strong and fashioned into the form of a clip and said clip having: a portion of rounded form for extending around the greater circumference of the tube to hold the same, portions adapted to be flexed inwardly when forced through said aperture, intermediate parts for lying in said aperture, outwardly projecting shoulders between the intermediate parts and the second named portions for engaging the side of the support opposite the first portion, and outwardly projecting shoulders between the intermediate parts and the first portion for engaging the support on the side of the first portion, said second named shoulders extending outwardly a distance greater than the first named shoulders and adapted to be flexed when the clip is positioned in the aperture whereby the support is gripped with tension, and the first named portion and second named shoulders being so relatively positioned that the first named portion is spaced from the support.

4. A clip for the attachment of a tube or the like to an apertured support comprising, a single length of spring material having its intermediate portion fashioned into loop form for receiving the tube and extending around the greater diameter of the tube for holding the same, the end portions of the length of material extending from the loop form substantially as tines, said tines having outwardly formed loops constituting shoulders for engagement with the support on the side next adjacent the tube, said shoulders being of such extent as to provide for flexing action thereof, said tines having intermediate portions for lying in the aperture, the ends of the tines converging toward each other and adapted to be forced through the aperture, said tines having outwardly projecting shoulders between said intermediate parts and the converging ends for engaging the support on the side opposite the first mentioned shoulders.

5. A clip for the attachment of a tube or the like to an apertured support comprising, a single length of spring material having its intermediate portion fashioned into loop form for receiving the tube and extending around the greater diameter of the tube for holding the same, the end portions of the length of material extending from the loop form substantially as tines, said tines having outwardly formed loops constituting shoulders for engagement with the support on the side next adjacent the tube, said shoulders being of such extent as to provide for flexing action thereof, said tines having intermediate portions for lying in the aperture, the ends of the tines converging toward each other adapted to be forced through the aperture, said tines having outwardly projecting shoulders between said intermediate parts and the converging ends for engaging the support on the side opposite the first mentioned shoulders, the distance between the first and second named shoulders being somewhat less than the thickness of the support, whereby when the clip is positioned the first mentioned shoulders are flexed and the support gripped with tension.

6. A spring steel clip formed from a single piece of metal for holding a tube or the like to a support having an aperture, wherein the central portion of the length of metal is formed into a bight portion for extending around the greater diameter of the tube to hold and grip the same, the ends of the length of metal extending from the bight portion in the form of tines and each tine having an outwardly projecting loop forming a spring shoulder for engaging the support, an intermediate part for lying in said aperture, an outwardly projecting shoulder for engaging the opposite side of the support, and an end portion adapted to be forced through said aperture.

7. A spring steel clip formed from a single piece of metal for holding a tube or the like to a support having an aperture, wherein the central portion of the length of metal is formed into a bight portion for extending around the greater diameter of the tube to hold and grip the same, the ends of the length of metal extending from the bight portion in the form of tines and each tine having an outwardly projecting loop forming a spring shoulder for engaging the support, an intermediate part for lying in said aperture, an outwardly projecting shoulder for engaging the opposite side of the support, and an end portion adapted to be inserted into and forced through said aperture, said end portions converging toward each other and contacting with each other substantially at their extreme ends whereby the intermediate parts and shoulders are held from collapsing inwardly.

8. A clip of a single piece of spring metal for attaching a tube or the like in spaced relation to an apertured support comprising, a portion for gripping and holding the tube, spaced members extending therefrom, said spaced members opposite the said portion arranged to be forced through the aperture in the support, said spaced members having outwardly projecting shoulders for engaging opposite sides of the support, said shoulders and the first mentioned portion being so relatively positioned that the tube held by said portion is spaced relative to the support when the clip is positioned in said aperture.

9. A clip of a single piece of spring metal for mounting tubing or the like to an apertured support comprising, a portion at one end of the clip for gripping the tube, spaced members extending therefrom, the ends of said members being arranged to be forced through the aperture, said members having outwardly projecting shoulders positioned between the tube holding portion and their ends for engaging opposite surfaces of the support to hold the clip positioned, some of the shoulders arranged to engage the support surface with spring tension, and said shoulders being spaced a substantial distance from first named portion, whereby to hold the tube substantially spaced from the support.

10. A clip of a single piece of metal for mounting tubing or the like to an apertured support, a portion at one end of said clip for gripping the tube by spring tension, an attaching means at the other end adapted to engage in the aperture in the support to secure the clip to said support, and a spacing means positioned between the ends of said clip, said spacing means and said tube-engaging portion being so relatively positioned that the tube held by said portion is spaced at a substantial distance relative to the support when the clip is secured thereto.

11. A clip of a single piece of metal for mounting tubing or the like to an apertured support comprising a portion at one end for gripping the tube, an attaching means at the other end adapted to engage the side of the support opposite said tube-engaging portion to secure the clip to said support, and a spacing means positioned between the ends of said clip and adapted to engage the other side of said support, said spacing means and said tube-engaging portion being so relatively positioned that the tube held by said portion is spaced at a substantial distance relative to the support when the clip is secured thereto.

12. A clip of a single piece of metal for mounting tubing or the like to an apertured support, a portion at one end for gripping the tubing, an attaching means at the other end adapted to engage the side of the support opposite said tube-engaging portion to secure the clip to said support, a yieldable spacing means positioned between the ends of said clip and adapted to engage in spring contact the other side of said support, said spacing means and said tube-engaging portion being so relatively positioned that the tube held by said portion is spaced at a substantial distance relative to the support when the clip is secured thereto.

E. QUIMBY SMITH.